Nov. 17, 1936.  H. WALTER  2,061,261
BUILT-UP ROTOR FOR GYROSCOPES
Filed April 1, 1933
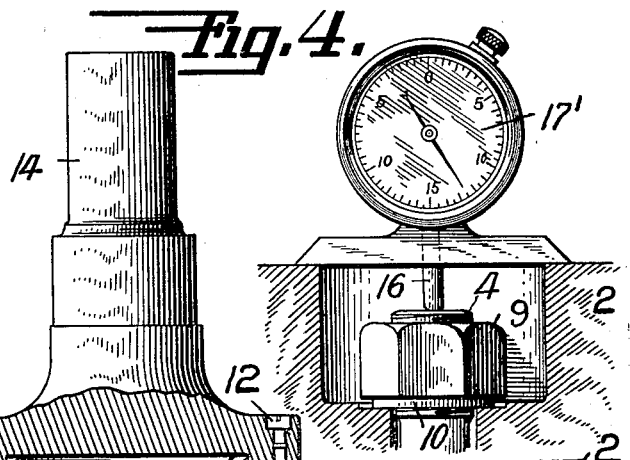
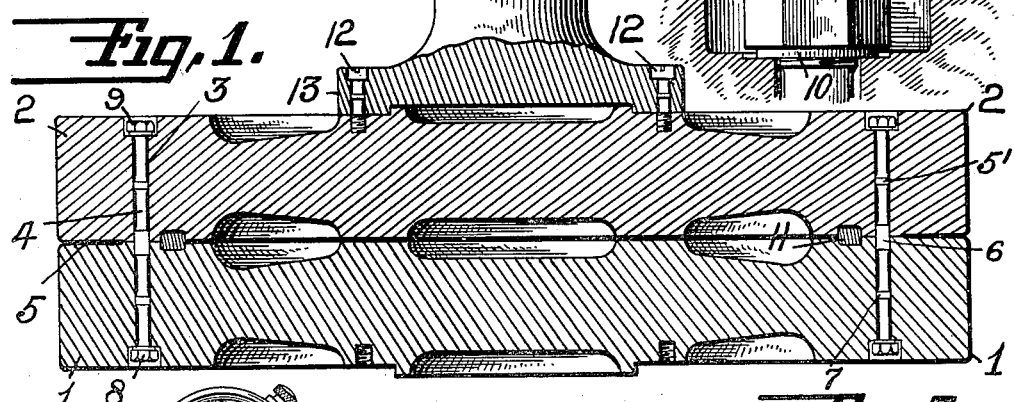
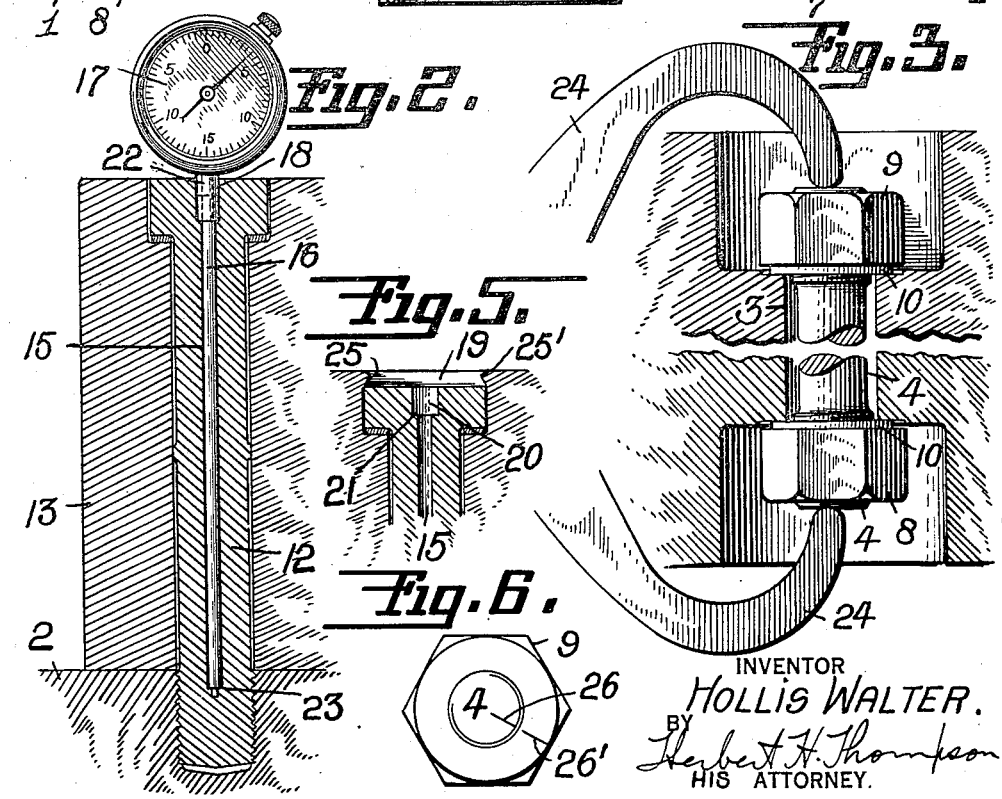
INVENTOR
HOLLIS WALTER.
BY
Herbert H. Thompson
HIS ATTORNEY.

Patented Nov. 17, 1936

2,061,261

UNITED STATES PATENT OFFICE 2,061,261

BUILT-UP ROTOR FOR GYROSCOPES

Hollis Walter, Baldwin, N. Y., assignor to Sperry Gyroscope Company, Inc., Brooklyn, N. Y., a corporation of New York Application April 1, 1933, Serial No. 663,911

3 Claims. (Cl. 74—572)

This invention relates to a novel construction of built-up flywheels or rotors and to the method of, and means employed for, assembling the several units of this novel built-up flywheel or rotor, which may be used for rotors of large stabilizing gyroscopes. Such rotors frequently are of such size that it is impractical to cast them in one piece and, therefore, they are built up of two or more discs to which are secured the stud shaft units forming the spinning axle for the rotor. It is very important that the bolts which secure together the various units be tightened to the exact calculated amount and all to the same amount so that the units are held together around the rims thereof with the same tension thus equalizing the stress on each bolt. I have found that a very accurate method of securing this desired result is by micrometer measurements of the length of the bolt before and after tightening, the lengthening of the bolt furnishing an accurate indication of the stress thereon and furnishing a ready means of equalizing the stress on all bolts.

Fig. 1 is a vertical section, partly in elevation, of a built up gyroscopic rotor of four units, i. e., two rotor discs and two stud shafts, the lower shaft being omitted.

Fig. 2 is a sectional detail through one of the bolts or set screws used for securing the stud shaft to the rotor and showing the method of measuring the elongation thereof.

Fig. 3 is a similar view of a bolt used to secure the rims of the two rotor discs together and showing micrometer calipers for measuring the elongation thereof.

Fig. 4 shows an alternative method of measuring the elongation of said bolts by means of a micrometer gauge Fig. 5 is a detail showing a method of locking the set screws in place after tightening.

Fig. 6 is a plan view of one of the bolts showing the marks that may be made thereon after tightening.

As stated, the rotor is shown in Fig. 1 as made up of two heavy flywheels or discs 1 and 2 which are preferably formed at their abutting edges or rims so as to abut only adjacent the bolt holes 3 through which the securing bolts 4 pass, the heavy broken line 5 representing clearance at other points. The long bolts 4 are symmetrically placed around the rims thereof and preferably are made of somewhat smaller diameter than the holes 3 except at spaced points 5', 6 and 7 where they are guided by the walls of the bore. The bolts are preferably threaded at each end and on the two ends are placed nuts 8, 9 under each of which is a washer 10. There is also placed between the discs a split ring 11 placed in channels formed in the two discs, the purpose of said ring being to prevent relative displacement of the discs when operating and consequent shearing of the bolts.

For securing the stud shaft to the rotor, I have shown machine screws 12 which pass through holes bored in the flange 13 of the stud shaft 14 and are threaded into tapped holes in the disc 2. Each of said screws is preferably provided with a small central bore 15 extending throughout most of its length and into which may be inserted a measuring stem 16 for measuring the elongation of the bolt before and after tightening by means of a micrometer gauge 17. Said gauge is provided with a foot 18 adapted to extend downwardly into the screw driving slot 19 and into an enlarged bore 20 at the top of the bore 15 so as to rest against the shoulder 21 formed thereby. The measuring rod 22 of the gauge has secured thereto the long stem 16 which engages the bottom 23 of the bore 15. The preferred procedure is to measure the length of each bore before tightening and then to tighten each bolt until it has elongated a predetermined amount. Where bolts of the same diameter, length and elasticity are employed (as is preferable) the elongation of each bolt should, of course, be equal. If desired, the bolt may then be heated by blowing hot air into the bore and retightened, and again measuring the amount of elongation so that the tightening in all cases is the same. To prevent the set screws 12 from turning after being tightened, the material of the flanges may be swaged into the end of the slot 19 as indicated at 25, 25' in Fig. 5.

Similarly the nuts 8 and 9 on the bolts 4 are tightened until the bolts are elongated the calculated amount. This may be measured by means of large micrometer calipers 24 extending around the outside of the periphery of the rotor or another method is to measure the distance of the top of each bolt from the top and bottom surfaces of the rotor discs as shown in Fig. 4 by means of a micrometer gauge 17'. This method has the advantage that it will show whether the bolt has remained centralized in the bore to keep the collars 5', 6 and 7 in the proper place because it measures the distance of each bolt head from the rotor face as shown in Fig. 4 so that if one end of the bolt has advanced nearer the rotor face than the other end, this fact will be at once indicated.

If desired, the bolt and nut may be marked as shown at 26, 26' in Fig. 6 so that loosening of the nut may be detected. Also after a period of operation, the length of the bolt may be again measured to determine whether it has weakened or elongated since the original tightening. By this means defective bolts may be detected and replaced. At this time all the bolts may be re-tightened to a predetermined amount to maintain the proper tension in each.

By my invention it is possible to build up large rotors employing a number of separate units or discs without the necessity for making unwieldy castings and with the same assurance of proper operation as if the rotor had been made in one piece.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A built-up rotor for gyroscopes comprising a plurality of similar solid discs having rim portions of substantial thickness and breadth, said discs having raised portions around abutting faces of their rims of less breadth than the rims, whereby said rims contact only around said portions, said rims having a plurality of axial holes through the center of said raised portions and bolts through said holes tightened to equal tension.

2. A built-up rotor for gyroscopes comprising a plurality of similar solid discs, said discs having raised portions around abutting faces of their rims, whereby said rims contact only around said portions, said rims having a plurality of axial holes therethrough around said portions, bolts through said holes tightened to equal tension, said rims also having a cooperating annular recess there-around, and a ring fitted therein to prevent radial movement of said discs.

3. A built-up rotor for gyroscopes comprising a plurality of similar solid discs having rim portions of substantial thickness and breadth, said discs having raised portions around abutting faces of their rims of less breadth than the rims, whereby said rims contact only around said portions, said rims having a plurality of axial holes through the center of said raised portions, bolts through said holes, and a nut on each end of each bolt whereby the nuts on the two ends of each bolt may be tightened the same amount to keep the bolts centralized.

HOLLIS WALTER.